United States Patent [19]

Hamling

[11] 3,860,529

[45] Jan. 14, 1975

[54] STABILIZED TETRAGONAL ZIRCONIA FIBERS AND TEXTILES

[75] Inventor: Bernard H. Hamling, Warwick, N.Y.

[73] Assignee: Union Carbide Corporation, New York, N.Y.

[22] Filed: May 1, 1972

[21] Appl. No.: 249,057

Related U.S. Application Data

[63] Continuation of Ser. No. 700,031, Jan. 24, 1968, abandoned.

[52] U.S. Cl. ............... 252/301.1 R, 106/57, 264/0.5
[51] Int. Cl. .............................................. C09k 3/00
[58] Field of Search ................ 252/301.1 R; 106/57; 264/0.5

[56] References Cited
UNITED STATES PATENTS

| 3,180,741 | 4/1965 | Wainer | 106/57 X |
| 3,222,148 | 12/1965 | Hay | 106/57 X |
| 3,385,915 | 5/1968 | Hamling | 264/0.5 X |
| 3,416,953 | 12/1968 | Gutzeit et al. | 106/57 X |
| 3,634,113 | 1/1972 | Fehrenbacher | 106/57 X |
| 3,663,182 | 5/1972 | Hamling | 264/0.5 X |

Primary Examiner—Benjamin R. Padgett
Assistant Examiner—R. E. Schafer
Attorney, Agent, or Firm—William Raymond Moran

[57] ABSTRACT

Zirconia fibers and textiles that are stabilized in the tetragonal form by small, carefully controlled amount of oxides of the metals of Group III B of the Periodic Table. The stabilized tetragonal zirconia fibers and textiles are useful as refractories, thermal insulators, battery spacers, fuel cell spacers, and the like.

4 Claims, No Drawings

STABILIZED TETRAGONAL ZIRCONIA FIBERS AND TEXTILES

This is a continuation, of application Ser. No. 700,031 filed Jan. 24, 1968 now abandoned.

The invention relates to zirconia fibers and textiles that are stabilized in the tetragonal form by small, carefully controlled amounts of oxides of the metals of Group III B of the Periodic Table, and to a process for producing the stabilized tetragonal zirconia fibers and textiles.

Zirconia ($ZrO_2$) has a fusion point of 2677°C., and is therefore a very useful refractory material. However, pure zirconia bodies are rarely used as refractories because of a phase change that occurs near 1,000°C. Below 1,000°C., pure zirconia exists in the monoclinic form, and when heated above 1000°C., it tranforms to the tetragonal form. The phase change at about 1,000°C. is accompanied by a large volume change which would cause a pure zirconia article to shatter. However, it is known that zirconia can be stabilized by firing with certain other refractory oxides to produce the cubic form which is stable over a wide range of temperatures. For instance, zirconia is frequently stabilized in the cubic form by firing to 1,700°C., or higher with 11.5 to 15 weight percent yttria, by firing to 1,550°C. or higher with 8 to 15 percent magnesia, or by firing to 1,500°C. or higher with 6 to 15 weight percent calcia. Zirconia can also be stabilized in the cubic form by silica, scandia, and oxides of the rare earth metals (i.e., lanthanide metal oxides). Discussions of known methods for stabilizing zirconia can be found on pages 364–367 of "Oxide Ceramics" by Eugene Ryshkewitch, Academic Press, New York (1960) and on pages 77–81 of "High-Temperature Technology," edited by I. E. Campbell, John Wiley and Sons, Inc., New York.

The present invention is based upon the discovery that zirconia fibers and textiles can be stabilized in the tetragonal form by small, carefully controlled amounts of oxides of metals of Group III B of the Periodic Table.

The oxides of metals of Group III B of the Periodic Table which are useful as stabilizers in this invention include scandia, yttria, oxides of the rare earth metals such as lanthana, ceria, and the like, and oxides of the metals of the actinide series such as uranium oxide. The preferred metal oxide stabilizers are yttria, ceria, and mixed rare earth metals oxide stabilizers can be used in mixture, if desired.

The stabilized tetragonal zirconia fibers and textiles are produced by the "relic process" which is described and claimed in copending application Ser. No. 576,840, now U.S. Pat. No. 3,385,915 filed Sept. 2, 1966, "Metal Oxide Fibers, Textiles and Shapes and Process for Producing Them," by Bernard H. Hamling, and in Belgian Pat. No. 697,315, filed Apr. 20, 1967 and made available to the public in late October, 1967. Briefly, the relic process for producing stabilized tetragonal zirconia fibers and textiles comprises the steps of:

a. impregnating an organic polymeric fabric or textile with a mixture of a zirconium compound and a Group III B metal compound, and b. heating the impregnated fabric or textile, at least partly in an oxidizing atmosphere, in order to carbonize and volatilize the organic polymer without igniting said polymer, and at the same time to insure conversion of the zirconium and Group III B metal compounds to their oxides. The resulting stabilized zirconia fiber or textile will have the same form as the original fiber or textile, although the dimensions will be reduced.

The zirconium compound and Group III B metal compound are normally introduced into the organic polymeric fabric or textile in solution. The solvent is preferably water, but suitable organic solvents can be used also. The action of the solvent apparently swells the amorphous matrix of the fiber polymer, thereby opening the interstices between the small crystallites of polymer chains (micelles or microfibrils). The dissolved metal compounds enter the swollen amorphous regions and become trapped there between the crystallites when the solvent is removed.

The precursor fiber or textile can be in the form of yarn, monofilaments, knitted textiles, woven textiles, and felts and other non-woven textiles, especially wherein the individual fibers have been interlocked to some extent by processes such as needle punching.

The precursor fibers or textiles can be made from any organic polymer provided that the polymer is characterized by the above-described structure of extremely small crystallites held together in a matrix of amorphous regions which enlarge and admit the metal compounds upon immersion in the metal compounds-containing material, which is usually a solution of the said metal compounds. Cellulosic materials such as rayon, saponified cellulose acetate, cotton, linen, and the like can be used as the fiber or textile. The fiber or textile can also be wool silk, acrylics, polyesters, polyamides, and polyurethanes. Preferred fabrics and textiles are those made from rayon.

Many different zirconium compounds and Group III B metal compounds can be used to impregnate the precursor fiber or textile. Specific illustrative examples include zirconyl chloride, zirconium acetate, zirconium oxalate, zirconium citrate, yttrium acetate, yttrium trichloride, yttrium oxalate, and the acetates and chlorides of scandium, cerium and other rare earth metals, and uranium.

Following impregnation of the fiber or textile with the metal compounds from a solvent solution, it is preferred to remove excess solution from the surfaces of the individual fibers in order to prevent accumulation of caked metal compound. This can be done by blotting, pressure rolling, centrifugation, or the like. The impregnated fiber or textile is then dried, for example, by air drying or heating in a stream of warm gas, prior to the heating steps which volatilize the organic polymeric presursor fiber or textile and form the tetragonal zirconia.

The heating step for volatilizing the precursor fiber or textile and forming the metal oxide is carried out under controlled conditions so as to avoid ignition of said fiber or textile. As an example of such controlled conditions, an impregnated cellulosic fiber or textile is heated in air to a temperature between about 350°C. and 900°C. at a rate of not more than about 100°C. per hour. Much faster heating times can also be used, as long as ignition of the precursor fiber or textile is avoided. After the initial formation of the metal oxide (which can occur at temperatures as low as about 350°–400°C.), a bake at 500°–600°C. or higher is desirable in order to achieve maximum elimination of impurities and densification of the zirconia.

The zirconia fibers and textiles are produced in the tetragonal form and they are stabilized in that form by the presence of the Group III B metal oxide (up to about 20 percent of the monoclinic form can be present in many cases without detrimental effect). the zirconia known to the prior art could be prepared in a metastable tetragonal form by decomposing a zirconium compound in air at temperatures below about 600°C. (usually between about 500° and 600°C.). However, such metastable zirconia reverted to the monoclinic form when heated above about 600°C., and thereafter its behavior with respect to crystallographic phase changes was identical to that of "conventional" zirconia. The Group III B metal oxide stabilizers prevent this reversion to monoclinic form at 600°C.

The Group III B metal oxide stabilizer is used in a small stabilizing amount sufficient to maintain at least about 80 percent of the zirconia fiber or textile in the tetragonal form when said zirconia fiber or textile is heated at about 800°C. for about one hour. The exact amount of stabilizer to be employed varies somewhat with the exact nature of the Group III B metal oxide stabilizer. For instance, it has been found that from about 0.5 to about 4, and preferably from 2 to 4, mole percent of yttria ($Y_2O_3$), based upon moles of zirconia plus yttria, are effective stabilizing amounts. Amounts of from about 5 to about 20 weight percent of ceria, based upon weight of zirconia plus ceria, have been found to be effective stabilizing amounts. Amounts of from about 5 to about 20 weight percent of mixed rare earth oxides, based upon weight of zirconia plus mixed rare earth oxides, have been found to be effective stabilizing amounts.

The exact amount of stabilizer oxide that is desired to be used depends, to an extent, upon the end use of the zirconia fiber or textile. In uses wherein the excellent resistance of zirconia to alkali is important, and wherein the use temperature is not excessively high (e.g., from 300° to 500°C.), as little as 0.5 mole percent yttria can be employed. An addition level of about 2 to 4 mole percent yttria is desired to enable the zirconia fiber or textile to be fired to the 800°–1000°C. range in order to eliminate impurities and permit maximum densification, and to thereby achieve maximum chemical resistance. As much as 10 or 20 percent of monoclinic zirconia is permissible in such uses. When the zirconia is to be used at temperatures above 1,000°C., from about 2 to 4 mole percent yttria is normally desired in order to achieve the best physical properties.

The stabilized tetragonal zirconia fibers and textiles of the invention have enhanced utility in many high temperature and corrosion resistant applications. The stabilized zirconia fibers and textiles can be used as battery separators, fuel cell separators, pipe liners and troughs for transferring molten metal, heat shields, and the like.

The Examples below illustrate the invention.

EXAMPLE 1

A series of zirconia cloths containing varying proportions of yttria were produced by the relic process. The initial cloth substrate was square weave, textile rayon. The rayon was preswollen in 1N hydrochloric acid, then rinsed in water. The cloth was impregnated by immersing it for 18 hours in 2.5 molar aqueous $ZrOCl_2$ containing varying quantities of $YCl_3$. The impregnated cloth was centrifuged three times at 4,000–4,600 rpm in an 11-inch diameter basket for a total of 20 minutes in order to remove excess salt solution. The cloth was then heated in a forced air oven. The initial temperature was 25°C., and the temperature was gradually increased over a period of 24 hours to a final temperature of 650°C. Thereafter, the cloth was fired as indicated in Table I below.

Table I, below, displays the $YCl_3$ content of the impregnating solution, the mole percent $Y_2O_3$ in the $ZrO_2$ cloth, and the crystallographic phases in the cloth after heat treating in air. The crystallographic phases were determined at room temperature by X-ray diffraction analysis. In Table I, M, T and C denote the monoclinic, tetragonal, and cubic phases, respectively, present in the $ZrO_2$ cloths.

TABLE I

Crystallographic Phases of $ZrO_2/Y_2O_3$ Cloth

| Cloth No. | $YCl_3$ Content of Solution Gm/liter | Mole % $Y_2O_3$ in Cloth | Crystal Structure After: | | | |
|---|---|---|---|---|---|---|
| | | | 1 hr. at 1000°C | 1 hr. at 1200°C | 1 hr. at 1400°C | 1 hr. at 1400°C |
| 1 | 0 | 0 | 93%M 7%T | 100%M | 100%M | 100%M |
| 2 | 3.6 | 1.29 | 90%M 10%T | 100%M | 100%M | 100%M |
| 3 | 7.2 | 2.08 | 9%M 91%T | 43%M 57%T | 96%M 4%T | 100%M |
| 4 | 13.9 | 2.73 | 100%T | 100%T | 100%T | 100%T |
| 5 | 26.2 | 5.52 | 100%C | 100%C | 100%C | 100%C |
| 6 | 37.4 | 7.10 | 100%C | 100%C | 100%C | 100%C |
| 7 | 47.8 | 9.57 | 100%C | 100%C | 100%C | 100%C |

EXAMPLE 2

A free-standing zirconia thermal insulation heat shield was fabricated. The heat shield assembly consisted of two half-cylinders measuring 4.3 inches internal diameter by 7.0 inches tall, with top and bottom circular plates. The wall thickness of the cylinder varied from 0.150 to 0.200 inch. The heat shield was produced by the following procedure:

Thirty mil satin weave zirconia cloth containing 2.2 mole percent yttria stabilizer was produced from rayon by the relic process by a procedure analogous to that described in Example 1. The cloth was fired to a final temperature of 1000°C. The zirconia cloth was then impregnated with a zirconia cement and wound around a cylinder to give a six-layer laminate. The zirconia cement is a mixture of 165 parts by weight of an aqueous solution of basic zirconyl chloride i.e., $ZrO(OH)Cl\cdot n$-$H_2O$, and yttrium trichloride (Sp. Gr. of the solution was 1.65 at about room temperature) in proportions to yield 4 weight percent (2.2 mole percent) yttria in zirconia when fired, and 100 parts by weight of a zirconia powder containing 4 weight percent yttria. The powder was prepared by flash decomposition at 600°–800°C. of an aqueous solution of zirconyl chloride and yttrium trichloride, followed by dry ball milling of the decomposition product for 20 hours and passing the powder through a 400 mesh screen. The weights of the cloth and cement was 340 and 220 grams, respectively. The laminate was then fired to a temperature of 1,000°C., over a period of 4 hours.

The heat shield was placed inside a tungsten-heated vacuum furnace. The furnace was cycled through twenty rapid heating and cooling cycles ranging from room temperature to 850°C. to 2,000°C. with no apparent damage to the heat shield other than a slight amount of warping. Unstabilized zirconia would have shattered during this test, probably during the first cycle.

EXAMPLE 3

Ten-mil zirconia satin weave cloth containing 4.56 weight percent yttria (i.e., 2.5 mole percent yttria) that was prepared by the relic process from rayon cloth, was fired to various temperatures and then immersed in 75 weight percent aqueous potassium hydroxide for 50 hours at 410°F. Table II, below, displays the firing times and temperatures (in air) and the tensile strengths before and after immersion in potassium hydroxide.

filaments. The rayon cloths were soaked for 17 hours in an aqueous solution of zirconyl chloride having a specific gravity of 1.400 ± .002 and which contained varying amounts of yttrium trichloride. The impregnated cloths were wet rolled once through rolls having an 8 ton nip load at a speed of 3.0 rpm. After air drying the cloths were again rolled once at the same conditions. The heating schedule was analogous to that described in Example 1, to a final temperature of 600°C.

Table III, below, displays the amounts of yttria and zirconia (as $YCl_3$ and $ZrOCl_2$) in the impregnating solutions and the weights of the rayon cloths that were used as the precursor fabric:

The maximum retention of strength was found with the cloth that was fired to 1,000°C. Unstabilized zirconia cannot be heated to temperatures nearly as high as 1,000°C. without forming the monoclinic phase which is not nearly as chemically resistant as the tetragonal phase, probably because the individual crystals are much larger in the monoclinc phase. All five $ZrO_2$ cloths stabilized with $Y_2O_3$ were still intact after contact with KOH and could be recovered from the KOH solution.

EXAMPLE 4

A series of zirconia cloths were made by the relic process analogous to the procedure described in Example 1. The precursor cloth was 5-harness satin-weave cloth using textile rayon yarn of 1,100 denier and 480

TABLE II

| Sample No. | Maximum Temp. °C | Hrs. at Temp. | Tensile Strength-lb/inch | |
|---|---|---|---|---|
| | | | Before Immersion | After Immersion |
| 1 | 650 | 5 | 0.8 | 0.02 |
| 2 | 700 | 1 | 1.0 | 0.02 |
| 3 | 800 | 1 | 0.7 | 0.05 |
| 4 | 900 | 1 | 0.9 | 0.17 |
| 5 | 1000 | 1 | 1.0 | 0.47 |

TABLE III

| Cloth No. | Mole Per Cent $Y_2O_3$ | Grams $Y_2O_3$[1](as $YCl_3$) per liter of Impregnating Solution | Grams $ZrO_2$[1](as $ZrOCl_2$) per liter of Impregnating Solution | Weight of Rayon Cloth |
|---|---|---|---|---|
| 1 | 0 | 0 | 312 | 272 |
| 2 | 0.5 | 0.69 | 307 | 270 |
| 3 | 1.0 | 1.23 | 305 | 272 |
| 4 | 1.5 | 1.83 | 304 | 266 |
| 5 | 2.0 | 2.52 | 305 | 266 |
| 6 | 2.5 | 3.32 | 303 | 267 |
| 7 | 3.0 | 4.17 | 301 | 264 |
| 8 | 3.5 | 5.39 | 301 | 267 |
| 9 | 4.0 | 6.84 | 297 | 265 |
| 10 | 5.0 | 11.28 | 289 | 265 |
| 11 | 6.0 | 13.93 | 289 | 266 |
| 12 | 12.0 | 31.10 | 268 | 263 |

[1] Zirconyl chloride and yttrium trichloride are often supplied commercially labeled with an assay of the number of grams per equivalent of the oxide.

Table IV, below, displays the mole percents of yttria found in the cloths (which, it will be noted, are not identical to the amounts that were in the impregnating solutions), and the crystallographic phases after heat treating for the indicated times.

| Solution No. | Cerium Oxide (Ce₂O₃) gm./liter | ZrO₂ gm./liter | Specific Gravity of Solution |
|---|---|---|---|
| 1 | 17.5 | 291 | 1.40 |
| 2 | 25.2 | 280 | 1.40 |
| 3 | 39.5 | 264 | 1.40 |

TABLE IV

Crystallographic Phases Present in $ZrO_2/Y_2O_3$ Cloths
After Heat Treatment in Air
(M = monoclinic; T = tetragonal; C = cubic)

| Cloth No. | Y₂O₃ Content mole % | Y₂O₃ Content wt. % | 2 hours at 600°C | 1 hour at 800°C | 1 hour at 1000°C | 1 hour at 1200°C | 1 hour at 1400°C |
|---|---|---|---|---|---|---|---|
| 1 | 0 | 0 | 91%T 9%M | 60%T 40%M | 14%T 86%M | 100%M | 100%M |
| 2 | 0.55 | 1.0 | 91%T 9%M | 80%T 20%M | 24%T 96%M | 100%M | 100%M |
| 3 | 0.72 | 1.3 | 93%T 7%M | 89%T 11%M | 25%T 75%M | 9%M 91%M | 100%M |
| 4 | 0.93 | 1.7 | 93%T 7%M | 89%T 11%M | 51%T 49%M | 12%T 88%M | 100%M |
| 5 | 1.0 | 1.8 | 92%T 8%M | 90%T 10%M | 45%T 55%M | 18%T 82%M | 4%T 96%M |
| 6 | 1.3 | 2.3 | 94%T 6%M | 94%T 6%M | 87%T 13%M | 25%T 75%M | 13%T 87%M |
| 7 | 1.4 | 2.6 | 93%T 7%M | 93%T 7%M | 93%T 7%M | 24%T 75TM | 8%T 72%M |
| 8 | 1.8 | 3.3 | 94%T 6%M | 93%T 7%M | 92%T 8%M | 49%T 51%M | 46%T 54%M |
| 9 | 2.4 | 4.3 | 95%T 5%M | 93%T 7%M | 94%T 6%M | 97%T 3%M | 100%T |
| 10 | 3.4 | 6.2 | 100%T | 100%T | 97%T 3%M | 100%T | 100%T |
| 11 | 3.8 | 6.9 | 95%T 5%M | 96%T 4%M | 100%T | 100%T | 100%T |
| 12 | 7.6 | 13.9 | 100%C | 100%C | 100%C | 100%C | 100%C |

Table V, below, displays the tensile strengths of the zirconia cloths after heat treatment in air at the indicated temperatures.

TABLE V

Tensile Strengths* of $ZrO_2/Y_2O_3$ Cloths
After Heat Treatment in Air

| Cloth No. | Y₂O₃ Content mole % | Y₂O₃ Content wt. % | 1 hour at 800°C | 1 hour at 1000°C | 1 hour at 1200°C | 1 hour at 1400°C |
|---|---|---|---|---|---|---|
| 1 | 0 | 0 | 0.44 | 0.46 | too weak for measurement | |
| 2 | 0.55 | 1.0 | 1.20 | 0.97 | too weak for measurement | |
| 3 | 0.72 | 1.3 | 1.92 | 0.58 | too weak for measurement | |
| 4 | 0.93 | 1.7 | 1.28 | 0.53 | 0.46 | |
| 5 | 1.0 | 1.8 | 1.45 | 0.90 | 0.82 | |
| 6 | 1.3 | 2.3 | 1.91 | 1.48 | 0.77 | |
| 7 | 1.4 | 2.6 | 2.39 | 2.54 | 0.57 | 0.40 |
| 8 | 1.8 | 3.3 | 2.38 | 2.98 | 1.48 | 1.04 |
| 9 | 2.4 | 4.3 | 2.96 | 2.83 | 5.61 | 2.84 |
| 10 | 3.4 | 6.2 | 4.22 | 4.32 | 5.23 | 8.19 |
| 11 | 3.8 | 6.9 | 3.51 | 4.95 | 6.89 | 5.61 |
| 12 | 7.6 | 13.9 | 0.93 | 2.56 | 1.84 | 2.63 |

* Reported in lb/in. Average of two pulls on each sample.

EXAMPLE 5

Tetragonal Stabilization of Zirconia Fibers with Cerium Oxide

Stabilized zirconia fibers containing additions of three levels of cerium oxide were prepared in the form of woven cloth employing the same method described previously in Example 4. Cerium oxide was used as the chloride salt which is commercially available and had a purity of 99.9.

Three aqueous solutions (2,000 ml each) used for impregnation of the fibers contained chloride salts having equivalent oxide compositions listed below:

The rayon fibers were impregnated with the salt by immersing 266 gm. of rayon in each case in the above solutions for a period of 19 hours at 70°F.

The fibers were subsequently treated in a manner analogous to Example 4 to convert the salt-loaded rayon fibers to oxide fibers. The three fibers were determined by x-ray diffraction analysis to be composed of tetragonal zirconia. The fibers contained 6.99, 10.70 and 16.95 weight percent cerium oxide, based upon total weight of fibers. The fibers containing the smallest amount of cerium oxide also contained 13 percent monoclinic zirconia. All three fibers were heated to 1000°C.

EXAMPLE 6

Tetragonal Stabilization of Zirconia Fibers with Rare Earth Oxide

Stabilized zirconia fibers containing additions of three levels of mixed rare earth oxides were prepared in the form of woven cloth employing the same method described in Example 4. The mixed rare earth oxide was used as the chloride salt which is commercially available and had the following composition:

| Rare Earth Oxide | Percentage by Weight |
|---|---|
| $La_2O_3$ | 24 |
| $CeO_2$ | 48 |
| $Pr_6O_{11}$ | 5 |
| $Nd_2O_3$ | 17 |
| $Sm_2O_3$ | 3 |
| $Gd_2O_3$ | 2 |
| $Y_2O_3$ | 0.2 |

Three aqueous solutions (2000 ml. each) used for impregnation of the rayon fibers contained chloride salts having equivalent oxide compositions listed below:

| Solution No. | Rare Earth Oxide gm./liter | $ZrO_2$ gm./liter | Specific Gravity of Solution |
|---|---|---|---|
| 1 | 17.3 | 289 | 1.40 |
| 2 | 25.1 | 279 | 1.40 |
| 3 | 40.0 | 269 | 1.40 |

The rayon fibers were impregnated with the salt mixture by immersing 266 gm. of rayon in each case in the above solutions for a period of 19 hours at 70°F.

The fibers were subsequently treated in a manner analogous to Example 4 to convert the salt loaded rayon fibers to oxide fibers. The three fibers, heated to 1,000°C., were determined by x-ray diffraction analysis to be composed of only tetragonal zirconia. The zirconia fibers contained 8.30, 10.30 and 16.55 weight percent rare earth oxides, based upon total weight of fibers.

EXAMPLE 7

The oxide fibers in cloth form containing the three levels of rare earth oxides (Example 6) and three levels of cerium oxide (Example 5) were tested for resistance to chemical attack by concentrated aqueous potassium hydroxide. (Potassium hydroxide is employed as the electrolyte in many secondary (rechargable-type) batteries and fuel cells and chemical and physical stability of electrode separators used in contact with the electrolyte often at temperatures in the range of 200°-500°F. is important to the efficient operation of these devices.

The six cloths were immersed in 75-85 percent potassium hydroxide (15-25 percent $H_2O$) held at 400°F. for a period of 360 hours. After this period they were removed from the solution and washed free of potassium hydroxide with water. All cloth specimens were recovered from the solution intact and had undergone no damage or changes visible to the eye. Weight changes and strengths of the cloth specimens after 360 hours contact with KOH at 400°F. are listed below:

TABLE VI

| Cloth No. | Oxide Stabilizer | Weight Loss Per Cent | Breaking Strength lb./inch width |
|---|---|---|---|
| 1, Example 6 | 6% Rare Earth Oxide | 12.8 | 1.7 |
| 2, Example 6 | 9% Rare Earth Oxide | 10.4 | 2.8 |
| 3, Example 6 | 15% Rare Earth Oxide | 6.6 | 3.3 |
| 1, Example 5 | 6% Cerium Oxide | 27.4 | 0.1 |
| 2, Example 5 | 9% Cerium Oxide | 5.4 | 1.8 |
| 3, Example 5 | 15% Cerium Oxide | 2.5 | 2.8 |

What is claimed is:

1. Fibrous zirconia containing an oxide of a metal of Group III B of the Periodic Table, said oxide being selected from the group consisting of scandia, lanthana, ceria and mixed rare earth oxides, said oxide being present in an amount of from about 5 to about 20 percent based upon weight of zirconia plus oxide to maintain at least about 80 percent of said fibrous zirconia in the tetragonal form when heated at about 800°C for about one hour.

2. The fibrous zirconia of claim 1 wherein said Group III B metal oxide is (a) from about 5 to about 20 weight percent of ceria, based upon weight of zirconia plus ceria, or (b) from about 5 to about 20 weight percent of mixed rare earth oxides, based upon weight of zirconia plus mixed rare earth oxides.

3. The fibrous zirconia of claim 1 wherein said fibrous zirconia is in the form of yarn, monofilament, knitted fabric, woven fabric, or non-woven fabric.

4. The fibrous zirconia of claim 2 wherein said fibrous zirconia is in the form of yarn, monofilament, knitted fabric, woven fabric, or non-woven fabric.

* * * * *